(12) United States Patent
Kim

(10) Patent No.: US 9,667,118 B2
(45) Date of Patent: May 30, 2017

(54) VIBRATION GENERATING DEVICE HAVING A FASTER REACTION SPEED

(71) Applicant: SAMSUNG ELECTRO-MECHANICS CO., LTD., Suwon-Si (KR)

(72) Inventor: Yong Tae Kim, Suwon-Si (KR)

(73) Assignee: MPLUS CO., LTD., Suwon-si, Gyeonggi-Do (KR)

( * ) Notice: Subject to any disclaimer, the term of this patent is extended or adjusted under 35 U.S.C. 154(b) by 176 days.

(21) Appl. No.: 14/625,623

(22) Filed: Feb. 18, 2015

(65) Prior Publication Data

US 2016/0079827 A1   Mar. 17, 2016

(30) Foreign Application Priority Data

Sep. 11, 2014   (KR) .................. 10-2014-0120214

(51) Int. Cl.
| H02K 7/06 | (2006.01) |
| H02K 5/24 | (2006.01) |
| H02K 7/08 | (2006.01) |
| H02K 7/10 | (2006.01) |
| H02K 21/24 | (2006.01) |
| H02K 29/03 | (2006.01) |
| H02K 29/08 | (2006.01) |
| H02K 11/33 | (2016.01) |

(52) U.S. Cl.
CPC ............ *H02K 7/063* (2013.01); *H02K 21/24* (2013.01); *H02K 29/03* (2013.01); *H02K 29/08* (2013.01); *H02K 11/33* (2016.01); *H02K 2213/03* (2013.01)

(58) Field of Classification Search
CPC .................... H02K 7/063; H02K 11/01

USPC ..................... 310/51, 81, 90, 90.5
See application file for complete search history.

(56) References Cited

U.S. PATENT DOCUMENTS

| 6,417,589 B1 * | 7/2002 | Kuyama | ................ H02K 7/063 |
| | | | 310/80 |
| 7,626,295 B2 * | 12/2009 | Yamaguchi | ........... F04D 29/281 |
| | | | 310/156.32 |
| 2004/0135444 A1 | 7/2004 | Choi et al. | |
| 2007/0103016 A1 * | 5/2007 | Park | ....................... H02K 7/061 |
| | | | 310/81 |

FOREIGN PATENT DOCUMENTS

| JP | 2004-174296 | 6/2004 |
| JP | 4067556 B2 | 3/2008 |
| KR | 10-1999-0078672 A | 11/1999 |
| KR | 20-0246187 Y1 | 10/2001 |
| KR | 10-2004-0060154 A | 7/2004 |
| KR | 10-2007-0048978 A | 5/2007 |

OTHER PUBLICATIONS

KIPO Office Action and Notice of Allowance for Korean Patent Application No. 10-2014-0120214.

\* cited by examiner

*Primary Examiner* — Jose Gonzalez Quinones
(74) *Attorney, Agent, or Firm* — LRK Patent Law Firm

(57) ABSTRACT

There is provided a vibration generating device including: a driving magnet of a rotor part rotated around a shaft and a coil part disposed to face the driving magnet and electromagnetically interacting with the driving magnet to rotate the rotor part, wherein the number of poles of the driving magnet and the number of coils of the coil part are the same as each other.

5 Claims, 5 Drawing Sheets

US 9,667,118 B2

VIBRATION GENERATING DEVICE HAVING A FASTER REACTION SPEED

CROSS-REFERENCE TO RELATED APPLICATION

This application claims the priority and benefit of Korean Patent Application No. 10-2014-0120214 filed on Sep. 11, 2014, with the Korean Intellectual Property Office, the disclosure of which is incorporated herein by reference.

BACKGROUND

The present disclosure relates to a vibration generating device.

Vibration generating devices, which convert electrical energy into mechanical vibrations through the generation of electromagnetic force, are commonly mounted in mobile phones, and the like, to thereby be used to silently notify users of call reception by transferring vibrations thereto.

Vibration generating devices may be mainly classified as devices generating mechanical vibrations using coils and magnets and devices generating mechanical vibrations using piezoelectric elements.

Recently, devices generating mechanical vibrations using piezoelectric elements have commonly been used in order to generate vibrations at the time of touches made to liquid crystal display panels provided in devices utilizing a touchscreen scheme such as smartphones.

That is, vibration motors generating mechanical vibrations using coils and magnets have a relatively slow reaction speed, and thus, they are not commonly used in devices utilizing a touchscreen scheme such as smartphones.

Therefore, the development of vibration motors having a faster reaction speed is required.

RELATED ART DOCUMENT (Patent Document 1) Korean Patent Laid-Open Publication No. 2004-0060154

SUMMARY

An aspect of the present disclosure may provide a vibration generating device having a faster reaction speed.

According to an aspect of the present disclosure, a vibration generating device may include: a driving magnet of a rotor part rotated around a shaft and a coil part disposed to face the driving magnet and electromagnetically interacting with the driving magnet to rotate the rotor part, wherein the number of poles of the driving magnet and the number of coils of the coil part are the same as each other.

BRIEF DESCRIPTION OF DRAWINGS

The above and other aspects, features and advantages of the present disclosure will be more clearly understood from the following detailed description taken in conjunction with the accompanying drawings, in which.

DETAILED DESCRIPTION

Figure 1:
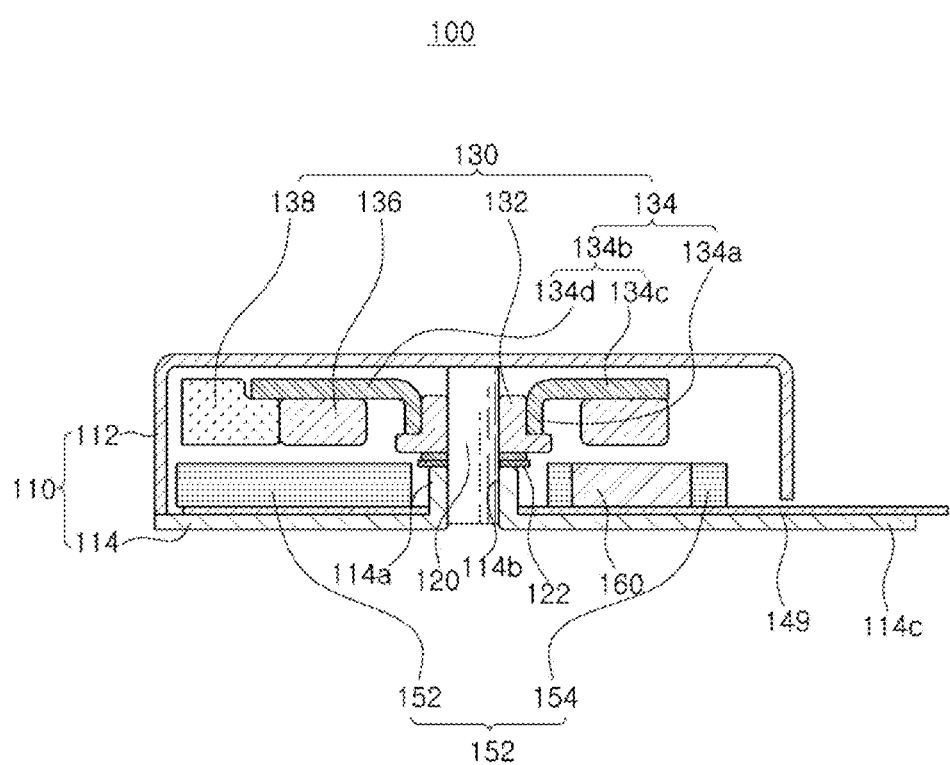
FIG. 1 is a schematic cross-sectional view of a vibration generating device according to an exemplary embodiment of the present disclosure.

Exemplary embodiments of the present disclosure will now be described in detail with reference to the accompanying drawings.

The disclosure may, however, be embodied in many different forms and should not be construed as being limited to the embodiments set forth herein. Rather, these embodiments are provided so that this disclosure will be thorough and complete, and will fully convey the scope of the disclosure to those skilled in the art.

In the drawings, the shapes and dimensions of elements may be exaggerated for clarity, and the same reference numerals will be used throughout to designate the same or like elements.

Figure 2:
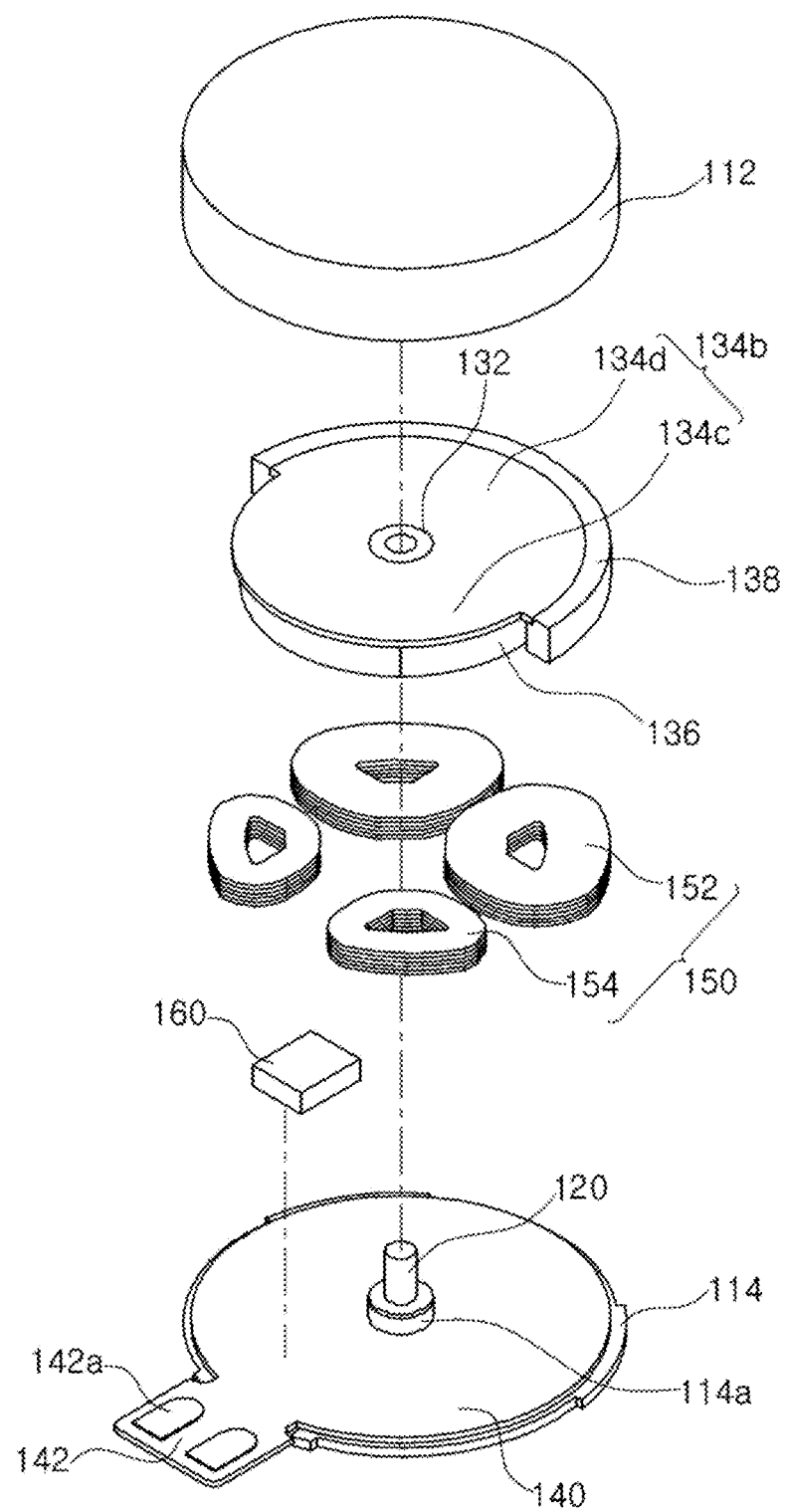
FIG. 2 is an exploded perspective view of the vibration generating device according to an exemplary embodiment of the present disclosure.

FIG. 1 is a schematic cross-sectional view of a vibration generating device according to an exemplary embodiment of the present disclosure; and FIG. 2 is an exploded perspective view of the vibration generating device according to an exemplary embodiment of the present disclosure.

Referring to FIGS. 1 and 2, a vibration generating device 100 according to an exemplary embodiment of the present disclosure may include a housing 110, a shaft 120, a rotor part 130, a circuit board 140, a coil part 150, and a driving control member 160 by way of example.

The housing 110 may have an internal space so that the shaft 120, the rotor part 130, the circuit board 140, the coil part 150, and the driving control part 160 may be installed. Meanwhile, the housing 110 may include an upper case 112 having a lower portion that is open and having a cylindrical shape and a bracket 114 assembled to the lower portion of the upper case 112.

The bracket 114 may include an installation part 114a protruding from a central portion thereof so that the shaft 120 is fixedly installed thereon, wherein the installation part 114a has an installation hole 114b into which the shaft 120 is inserted. That is, the shaft 120 may be inserted into the installation hole 114b.

Meanwhile, the bracket 114 may include an extension part 114c on which a portion of the circuit board 140 extended externally from the housing 110 is seated, wherein the extension part 114c is extended in a radial direction.

The shaft 120 may be fixed to the installation part 114a of the bracket 114, as described above, and the rotor part 130 may rotate around the shaft 120.

Meanwhile, the shaft 120 may be installed with a washer member 122 allowing the rotor part 130 to be spaced apart from an upper surface of the installation part 114a. That is, the washer member 122 may be coupled to the shaft 120 to be seated on the upper surface of the installation part 114a.

The rotor part 130 may be rotatably installed on the shaft 120. Meanwhile, the rotor part 130 may include a bearing member 132, a yoke member 134, a driving magnet 136, and amass body 138 by way of example.

The bearing member 132 may be installed on the shaft 120 and serve to allow the rotor part 130 to be more smoothly rotated. Meanwhile, an outer peripheral surface of the bearing member 132 may be stepped in order to fixedly install the yoke member 134.

Meanwhile, the yoke member 134 may include a disk part 134*b* and a cylindrical wall part 134*a* extended from a central portion of the disk part 134*b*. In addition, the disk part 134*b* may include a first semicircular part 134*c* and a second semicircular part 134*d* having a diameter larger than that of the first semicircular part 134*c*.

The driving magnet 136 may be installed on the disk part 134*b* of the yoke member 134, and the mass body 138 may be installed on the disk part 134*b* to be disposed outside of the driving magnet 136 in the radial direction. That is, the driving magnet 136 may have a circular ring shape, and the mass body 138 may have a semi-ring shape.

A detailed description for the driving magnet 136 will be provided below.

The circuit board 140 may be installed on the bracket 114 of the housing 110, and a portion thereof may be extended externally from an inner portion of the housing 110. Meanwhile, the circuit board 140 may be a flexible circuit board. In addition, a terminal part 142 of the circuit board 140 extended externally may have electrodes 142*a* formed therein to be electrically connected to an external power supply.

The coil part 150 may be installed on the circuit board 140. In addition, the coil part 150 may electromagnetically interact with the driving magnet 136 to serve to rotate the rotor part 130.

Meanwhile, the coil part 150 may include first coils 152 and second coils 154. Here, the number of first coils 152 and the number of second coils 154 may be two. In addition, the first coil 152 may be larger than the second coil 154. Further, the first and second coils 152 and 154 may be single-phase coils. As described above, the coil part 150 may include a plurality of coils to increase a reaction speed.

The driving control member 160 may be disposed between the second coils 154. In addition, the driving control member 160 may include a hall sensor (not shown) sensing the driving magnet 136. As an example, the driving control member 160 may be an integrated circuit (IC) chip.

Next, an operation of the vibration generating device according to an exemplary embodiment of the present disclosure will be described in more detail with reference to FIG. 3.

Figure 3:
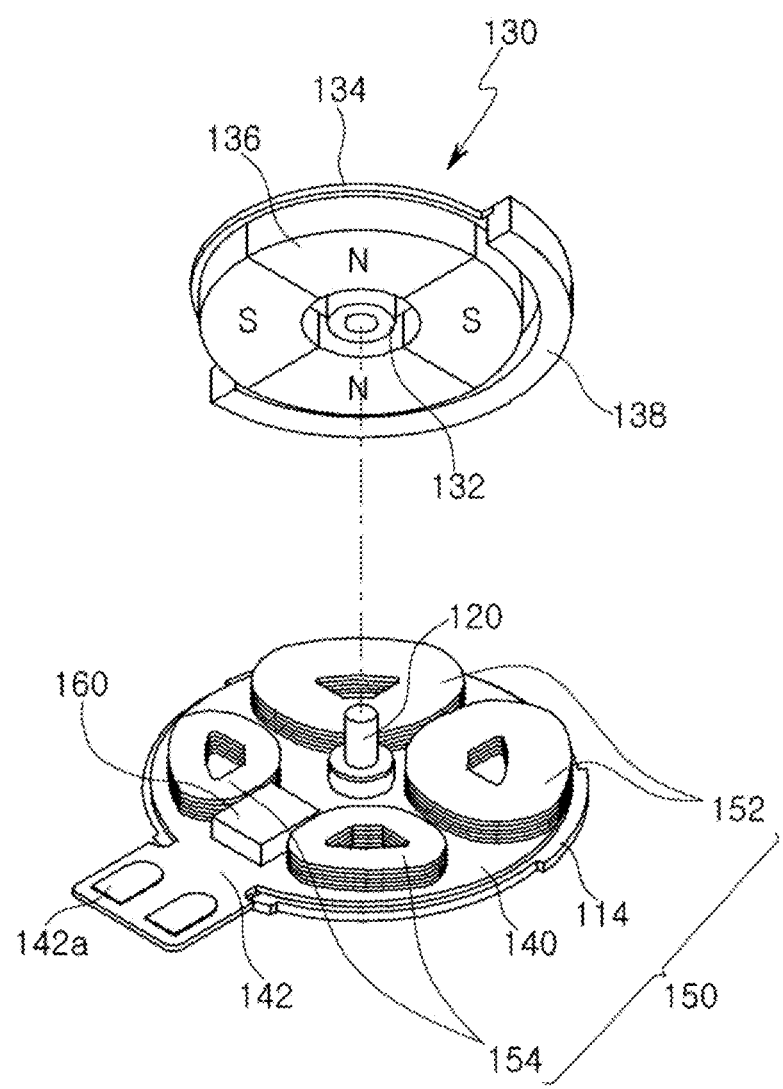
FIG. 3 is an exploded perspective view of a coil part and a rotor part of the vibration generating device according to an exemplary embodiment of the present disclosure.

FIG. 3 is an exploded perspective view of a coil part and a rotor part of the vibration generating device according to an exemplary embodiment of the present disclosure.

Referring to FIG. 3, the driving magnet 136 may have two pairs of N and S poles. That is, the N and S poles of the driving magnet 136 may be alternately disposed in a circumferential direction.

Meanwhile, the coil part 150 may include the first and second coils 152 and 154 having the same number as a total number of poles (that is, the number of N and S poles) of the driving magnet 136.

As described above, the total number of poles of the driving magnet 136 and the number of coils included in the coil part 150 may be the same as each other, such that the reaction speed may be further increased. In other words, the number of coils may be increased, such that electromagnetic force by an electromagnetic interaction between the coils and the driving magnet 136 may be increased, thereby achieving a faster reaction speed.

Further, the driving control member 160 including the hall sensor (not shown) may be disposed below the driving magnet 136, and a voltage may be applied to the coil part 150 after a state of the driving magnet 136 is confirmed by the hall sensor included in the driving control member 160.

That is, after positions of the N and S poles of the driving magnets 136 are detected by the hall sensor, the voltage may be applied to the coil part 150.

Therefore, the rotor part 130 may be rotated faster in a state in which it is stopped.

In addition, since a rotation speed of the rotor part 130 may be changed by changing a magnitude of the voltage applied to the coil part 150, strength of vibrations may be more easily adjusted.

Further, since the vibrations may be generated by the rotation of the rotor part 130, the vibration generating device may be easily thinned. In other words, a thickness of the vibration generating device 110 may be more easily decreased by increasing a length of the vibration generating device in the radial direction, such that the vibration generating device may be easily thinned.

Hereinafter, a vibration generating device according to another exemplary embodiment of the present disclosure will be described with reference to FIG. 4.

Figure 4:
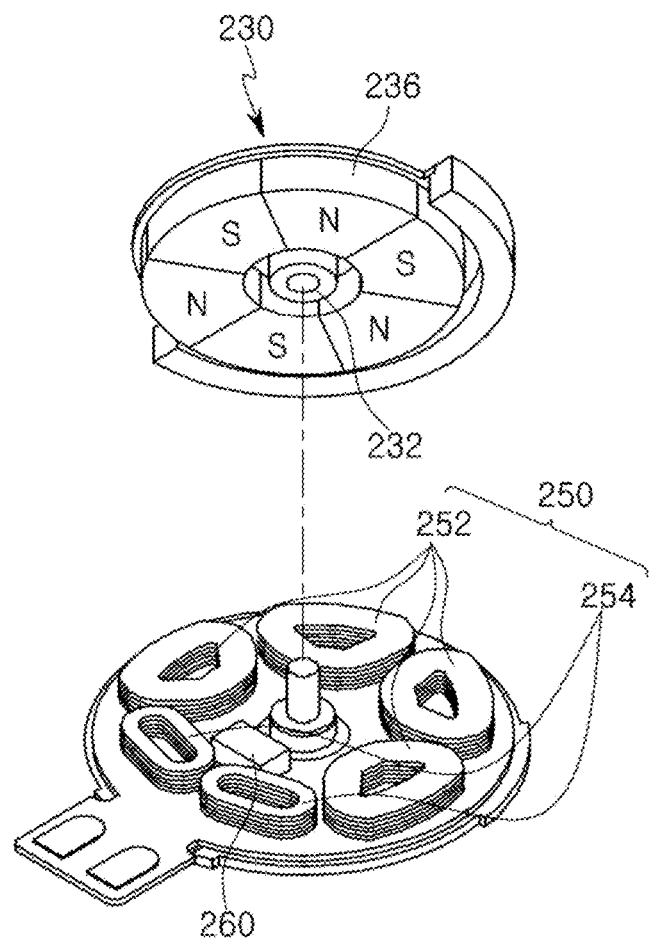
FIG. 4 is an exploded perspective view of a vibration generating device according to another exemplary embodiment of the present disclosure.

FIG. 4 is an exploded perspective view of a vibration generating device according to another exemplary embodiment of the present disclosure.

Referring to FIG. 4, a coil part 250 may include first coils 252 and second coils 254. Here, the number of first coils 252 may be four, and the number of second coils 254 may be two. That is, a total number of first and second coils 252 and 254 may be six. In addition, the first coil 252 may be larger than the second coil 254. Further, the first and second coils 252 and 254 may be single-phase coils. As described above, the coil part 250 may include a plurality of coils to increase a reaction speed.

Meanwhile, a driving magnet 236 may have three pairs of N and S poles. That is, the three pairs of N and S poles of the driving magnet 236 may be alternately disposed in the circumferential direction.

Meanwhile, the coil part 250 may include the first and second coils 252 and 254 having the same number as a total number of poles (that is, the number of N and S poles) of the driving magnet 236.

As described above, the total number of poles of the driving magnet 236 and the number of coils 252 and 254 included in the coil part 250 may be the same as each other, such that the reaction speed may be further increased. In other words, the number of coils may be increased, such that electromagnetic force by an electromagnetic interaction between the coils and the driving magnet 236 may be increased, thereby achieving a faster reaction speed.

Further, a driving control member 260 including the hall sensor (not shown) may be disposed below the driving magnet 236, and a voltage may be applied to the coil part 250 after a state of the driving magnet 236 is confirmed by the hall sensor included in the driving control member 260.

That is, after positions of the N and S poles of the driving magnets 236 are detected by the hall sensor, the voltage may be applied to the coil part 250.

Therefore, a rotor part 230 may be rotated faster in a state in which it is stopped.

Next, modified examples of a yoke member of a rotor part will be described with reference to FIGS. 5 and 6.

Figure 5:
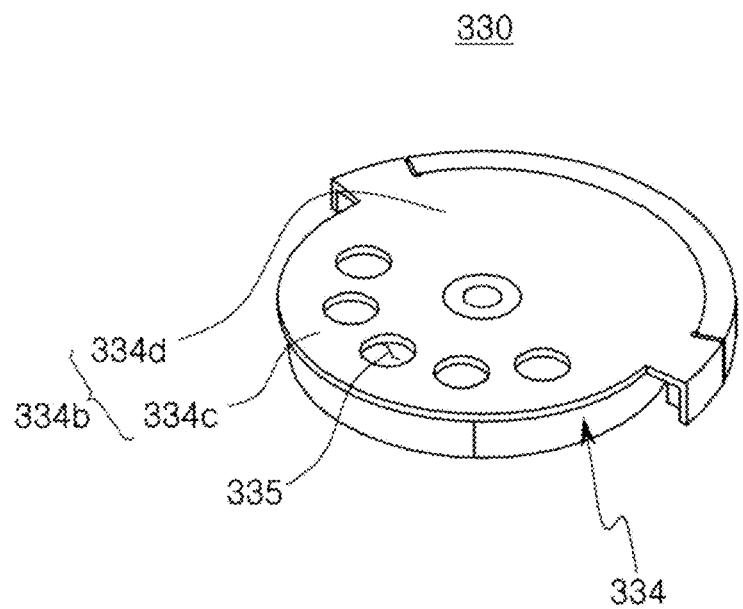
FIG. 5 is a perspective view of a rotor part including a first modified example of a yoke member.

FIG. 5 is a perspective view of a rotor part including a first modified example of a yoke member.

Referring to FIG. 5, a first disk part 334*c* of a yoke member 334 may include a plurality of through-holes 335. The through-holes 335 are formed in the yoke member 334, as described above, whereby a moment of inertia of the yoke member 334 may be decreased. Therefore, the reaction speed may be further increased.

Further, since the through-holes 335 are formed in the first disk part 334c of the yoke member 334, an eccentric amount of a rotor part 330 may be increased, such that a vibration amount may be increased.

Figure 6:
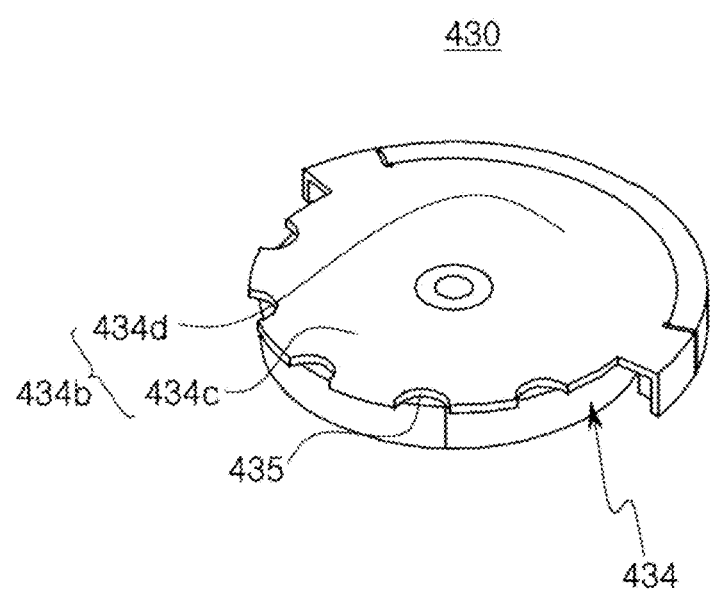
FIG. 6 is a perspective view of a rotor part including a second modified example of a yoke member.

FIG. 6 is a perspective view of a rotor part including a second modified example of a yoke member.

Referring to FIG. 6, a first disk part 434c of a yoke member 434 may include a plurality of recesses 435. The recesses 435 are formed in the yoke member 434, as described above, whereby a moment of inertia of the yoke member 434 may be decreased. Therefore, the reaction speed may be further increased.

Further, since the recesses 435 are formed in the first disk part 434c of the yoke member 434, an eccentric amount of a rotor part 430 may be increased, such that a vibration amount may be increased.

As set forth above, according to exemplary embodiments of the present disclosure, a vibration generating device may have a faster reaction speed.

While exemplary embodiments have been shown and described above, it will be apparent to those skilled in the art that modifications and variations could be made without departing from the scope of the present invention as defined by the appended claims.

What is claimed is:

1. A vibration generating device comprising:
a housing having an internal space;
a circuit board which is fixed to the housing and of which a portion is extended externally from the housing;
a coil part including at least four coils which are installed on the circuit board;
a rotor part rotated around a shaft and including a driving magnet which is disposed to face the coil part; and
a driving control member installed on the circuit board and detecting a position of the driving magnet,
wherein the rotor part comprises:
a bearing member rotatably installed on the shaft;
a yoke member installed on the bearing member and rotated together with the bearing member;
the driving magnet having a circular ring shape and fixed to a lower surface of the yoke member; and
a mass body having a semi-ring shape and fixed to the lower surface of the yoke member and disposed outside of the driving magnet,
wherein the yoke member comprises:
a disk part having a circular plate shape; and
a cylindrical wall part extended downwardly from a central portion of the disk part, and
wherein the disk part comprises:
a first semicircular part in which a plurality of through-holes or recesses are provided; and
a second semicircular part which is extended from the first semicircular part and has a diameter larger than that of the first semicircular part, and on which the mass body is installed.

2. The vibration generating device of claim 1, wherein the coil part includes a pair of first coils which are disposed symmetrically with respect to each other and a pair of second coils which are disposed symmetrically with respect to each other, on the basis of a symmetrical line passing through the shaft, the first coils are larger than the second coils.

3. The vibration generating device of claim 2, wherein the second coils are disposed on both sides of the driving control member.

4. The vibration generating device of claim 1, wherein a total number of poles of the driving magnet is the same as that of coils included in the coil part.

5. The vibration generating device of claim 1, wherein the housing includes:
an upper case having an internal space and having a cylindrical shape, a lower portion of which is open; and
a bracket assembled to the lower portion of the upper case and having a plate shape.

* * * * *